(12) United States Patent
Hannemann et al.

(10) Patent No.: US 6,434,925 B2
(45) Date of Patent: Aug. 20, 2002

(54) GAS AND STEAM TURBINE PLANT

(75) Inventors: Frank Hannemann, Spardorf; Ulrich Schiffers, Eckental, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/829,331

(22) Filed: Apr. 9, 2001

Related U.S. Application Data

(63) Continuation of application No. PCT/DE99/03222, filed on Oct. 6, 1999.

(30) Foreign Application Priority Data

Oct. 7, 1998 (DE) .......................................... 198 46 225

(51) Int. Cl.$^7$ ............................... F02C 3/00; F02C 6/00
(52) U.S. Cl. ................... 60/39.12; 60/39.192; 60/39.55
(58) Field of Search ......................... 60/39.17, 39.192, 60/39.55

(56) References Cited

U.S. PATENT DOCUMENTS

| | | | |
|---|---|---|---|
| 4,697,415 A | | 10/1987 | Schiffers |
| 4,969,324 A | | 11/1990 | Woodson |
| 5,345,756 A | | 9/1994 | Jahnke et al. |
| 5,865,023 A | * | 2/1999 | Sorenson et al. .......... 60/39.02 |
| 6,148,602 A | * | 11/2000 | Demetri ....................... 6/39.05 |
| 6,301,873 B2 | * | 10/2001 | Hanneman et al. ........ 60/39.12 |
| 6,314,715 B1 | * | 11/2001 | Stats .......................... 60/39.02 |

FOREIGN PATENT DOCUMENTS

| | | |
|---|---|---|
| EP | 0 453 059 A1 | 10/1991 |
| GB | 2 234 984 A | 2/1991 |

* cited by examiner

*Primary Examiner*—Charles G. Freay
(74) *Attorney, Agent, or Firm*—Laurence A. Greenberg; Werner H. Stemer; Ralph E. Locher

(57) ABSTRACT

A gas and steam turbine plant includes a waste-heat steam generator which is located downstream of a gas turbine on the flue-gas side and which has heating surfaces that are connected into a water/steam circuit of a steam turbine. A gasification device is located upstream of a combustion chamber of the gas turbine through a fuel line, for the integrated gasification of a fossil fuel. The gas and steam turbine plant is to be operated with particularly high plant efficiency even when oil is used as the fossil fuel. Thus, a heat exchanger is connected on the primary side into the fuel line upstream of a mixing apparatus for admixing nitrogen to the gasified fuel, as seen in the direction of flow of the gasified fuel. The heat exchanger is constructed on the secondary side as an evaporator for a flow medium.

4 Claims, 2 Drawing Sheets

GAS AND STEAM TURBINE PLANT

CROSS-REFERENCE TO RELATED APPLICATION

This application is a continuation of copending International Application No. PCT/DE99/03222, filed Oct. 6, 1999, which designated the United States.

BACKGROUND OF THE INVENTION

FIELD OF THE INVENTION

The invention relates to a gas and steam turbine plant with a waste-heat steam generator which is located downstream of a gas turbine on the flue-gas side and which has heating surfaces that are connected into a water/steam circuit of a steam turbine. A fuel gasification device is located upstream of a combustion chamber of the gas turbine through a fuel line.

A gas and steam turbine plant with integrated gasification of fossil fuel conventionally includes a fuel gasification device which is connected on the outlet side to the combustion chamber of the gas turbine through a number of components provided for gas purification. In that case, a waste-heat steam generator is connected downstream of the gas turbine, on the flue-gas side. Heating surfaces of the waste-heat steam generator are connected into the water/steam circuit of the steam turbine. A plant of that type is known, for example, from UK Patent Application GB 2 234 984 A or from U.S. Pat. No. 4,697,415.

An apparatus for the removal of sulfur-containing constituents is provided, in both plants, for the reliable purification of the gasified fossil fuel. In the plant known from UK Patent Application GB 2 234 984 A, a saturator for inerting the fuel gas is located downstream of that apparatus in a supply line for the gasified fuel which opens into the combustion chamber. The gasified fuel is laden with steam in that saturator in order to reduce pollutant emissions. For that purpose, the gasified fuel flows through the saturator in countercurrent to a water stream which is carried in a water circuit referred to as a saturator circuit. A provision is made for feeding heat from the water/steam circuit into the saturator circuit in that case, in order to operate the saturator independently of the gas generation or gas purification plant.

That plant is intended to operate with gasified coal or gasified refinery residues, for example residual oil, as fossil fuel and is therefore also adapted to process properties for the gasification of coal or of residual oil with a view toward achieving particularly high efficiency. In particular, the plant is constructed in terms of the water/steam circuit of the steam turbine, with a view toward cost-effective and operationally reliable utilization of the heat occurring during gasification.

SUMMARY OF THE INVENTION

It is accordingly an object of the invention to provide a gas and steam turbine plant, which overcomes the hereinafore-mentioned disadvantages of the heretofore-known devices of this general type, which has a particularly simple structure and in which both high plant efficiency and independent and simple-to-regulate operation for inerting fuel gas are ensured, even when oil is used as a fossil fuel.

With the foregoing and other objects in view there is provided, in accordance with the invention, a gas and steam turbine plant, comprising a gas turbine having a flue-gas side. A combustion chamber which is connected to the gas turbine has a water/steam circuit. A waste-heat steam generator is disposed downstream of the gas turbine on the flue-gas side. The steam generator has heating surfaces connected into the water/steam circuit. A fuel line is connected to the combustion chamber. A gasification device for producing gasified fuel is connected into the fuel line, upstream of the combustion chamber. A mixing apparatus is connected into the fuel line for admixing nitrogen to the gasified fuel. A heat exchanger has a primary side connected into the fuel line, upstream of the mixing apparatus, as seen in a flow direction of the gasified fuel. The heat exchanger has a secondary side constructed as an evaporator for a flow medium, as well as a steam side connected to the combustion chamber.

The invention disclosed herein is based on the concept that for high plant efficiency, even when oil is used as a fossil fuel, particularly effective utilization of the heat carried in the fuel stream flowing off from the gasification device, which is also referred to as crude gas, should be provided. At the same time, precisely when oil is used as a fossil fuel, it should be kept in mind that a large part of the crude-gas heat may occur in the form of latent heat as a result of partial water condensation at comparatively low temperature. It is precisely this heat which can be extracted from the crude-gas stream in a particularly advantageous way by the evaporation of a flow medium. The flow medium is capable of being fed into the plant process at a suitable point in a particularly simple and flexible way. In addition, and for permitting the inerting system for the fuel gas to operate independently of the water/steam circuit of the steam turbine located downstream of the gas turbine, with a suitable choice of the pressure level, the steam that is generated can be fed directly as an inerting medium to the fuel gas or to the GT burner. In this case, through the use of the heat exchanger, particularly favorable operating parameters, in particular a particularly favorable temperature level, of the crude gas can be established for the subsequent mixing of the crude gas with nitrogen. This mixing is intended for the purpose of adhering to particularly low NOx limit values.

Supplying the steam generated in the heat exchanger into the fuel stream makes it possible to fully ensure that the gasified fuel is laden with steam sufficiently to adhere to even low pollutant emission limit values. Therefore, complicated devices normally provided for loading the gasified fuel with steam may be dispensed with completely. In particular, a gas and steam turbine plant of this type can be constructed so as to dispense with the saturator which is normally provided, together with the further components associated therewith, so that a particularly simple structure is obtained. Moreover, feeding the evaporated flow medium into the combustion chamber of the gas turbine ensures that the heat extracted from the crude gas during the evaporation of the flow medium is utilized particularly effectively for the plant process. The apparatus also allows simple and operationally reliable regulation of the steam content of the fuel gas in order to adhere to the predetermined limit values for NOx emission.

In accordance with another feature of the invention, the heat exchanger is constructed as a medium-pressure evaporator for water as the flow medium. In this case, the heat exchanger is constructed preferably for evaporating the water at a pressure stage of about 20 to 25 bar. Thus, medium-pressure steam generated in this way and not required to be fed into the combustion chamber can also be utilized in a particularly advantageous way for the plant process and may, for example, be fed into the water/steam circuit of the steam turbine.

In accordance with a further feature of the invention, the heat exchanger is connected to a low-pressure stage of the water/steam circuit of the steam turbine on the steam side through a branch line, into which a shut-off member and a throttle apparatus are connected. In this case, the gas and steam turbine plant may be constructed in such a way as to ensure that a steam quantity which is sufficient for adhering to predetermined pollutant emission limit values and which is to be supplied to the fuel is produced in every operating state. Thus, after throttling, possibly excess steam generated in the heat exchanger can be utilized directly for energy generation in order to achieve particularly high efficiency in the low-pressure stage of the water/steam circuit. Conversely, if the NOx emission requirements are particularly stringent, additional medium-pressure steam from the water/steam circuit may also be admixed, preferably upstream of the intermediate superheater of the waste-heat boiler.

In a further advantageous refinement, the heat exchanger for medium-pressure steam generation has a further heat exchanger for low-pressure steam generation disposed downstream thereof, so that the maximum fraction of crude-gas heat at low temperature can be utilized with high efficiency. The generated steam, together with the throttled medium-pressure steam, may be delivered to the low-pressure part of the water/steam circuit. A further heat exchanger for cooling the crude gas may be provided, depending on the gas purification requirements, in particular the temperature level of possibly downstream COS hydrolysis.

In accordance with a concomitant feature of the invention, for particularly high plant efficiency, there is provided a crude-gas waste-heat steam generator preceding the medium-pressure evaporator in the fuel line upstream of the heat exchanger. Through the use of the crude-gas waste-heat steam generator, it is possible for the crude gas or synthesis gas generated in the gasification device to be precooled as required and in a manner which is advantageous in material terms.

The advantages achieved through the use of the invention are, on one hand, in particular, that even when oil is used as a fossil fuel, particularly high overall efficiency of the plant can be achieved. Utilizing the heat which is carried in the crude gas and which may, in particular, take the form of latent heat at a comparatively low temperature level in order to evaporate the flow medium, makes it possible to supply this heat into the plant process in a particularly effective and flexible way. Particularly when water is evaporated as the flow medium and this steam is subsequently fed into the mixed gas, it becomes possible for the mixed gas to be sufficiently laden with steam, even without connecting a saturator which per se, together with the further components associated therewith, would entail a significant outlay in terms of manufacture and assembly. On the other hand, admixing the steam makes it possible to set the degree of saturation of the fuel gas over a wide parameter range and to provide a simple and quick-reacting concept for regulating the steam content. This ensures that even low limit values for pollutant emission are adhered to at a particularly low outlay.

Other features which are considered as characteristic for the invention are set forth in the appended claims.

Although the invention is illustrated and described herein as embodied in a gas and steam turbine plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
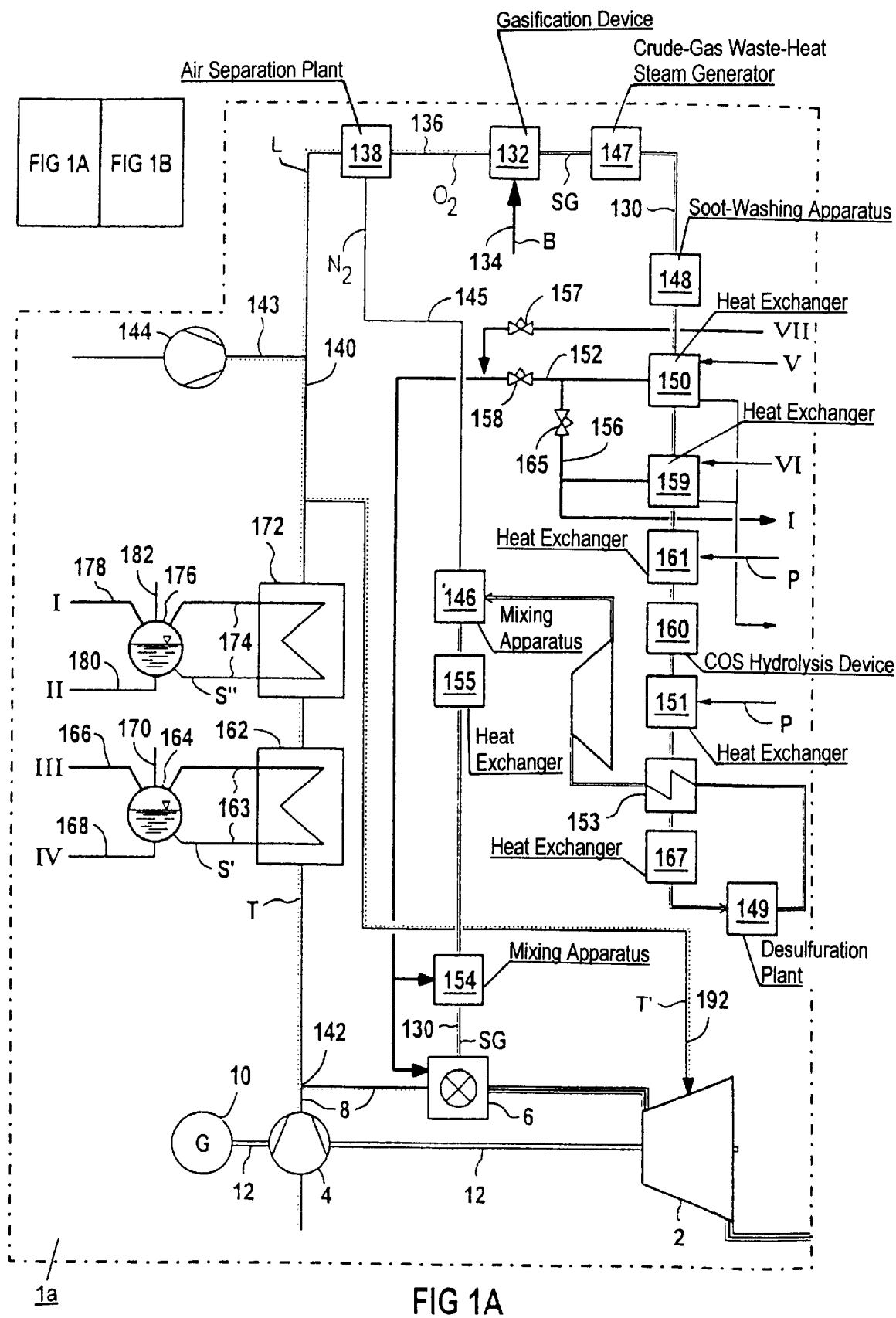
FIGS. 1A and 1B are left and right-hand portions of a schematic and block diagram of a gas and steam turbine plant, as illustrated in a legend in FIG. 1A.
Figure 1B:
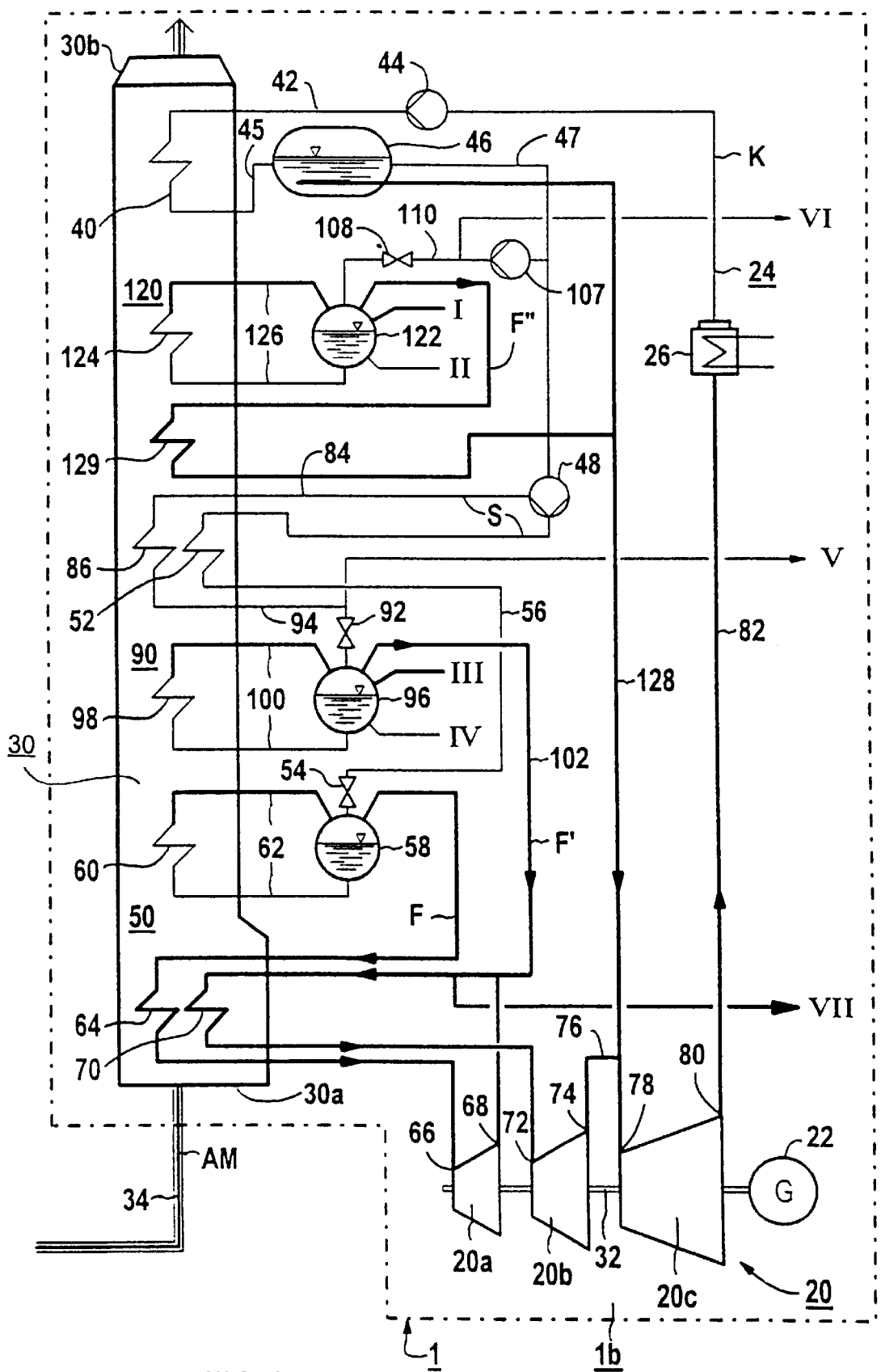

Referring now in detail to FIGS. 1A and 1B of the drawings as a whole, there is seen a gas and steam turbine plant 1 including a gas turbine plant 1a and a steam turbine plant 1b. The gas turbine plant 1a includes a gas turbine 2 with a coupled air compressor 4 and a combustion chamber 6 which is located upstream of the gas turbine 2 and is connected to a compressed-air line 8 of the compressor 4. The gas turbine 2 and the air compressor 4 as well as a generator 10 are seated on a common shaft 12.

The steam turbine plant 1b includes a steam turbine 20 with a coupled generator 22 as well as a water/steam circuit 24 in which a condenser 26 located downstream of the steam turbine 20 and a waste-heat steam generator 30 are disposed. The steam turbine 20 is formed of a first pressure stage or high-pressure part 20a, a second pressure stage or medium-pressure part 20b and a third pressure stage or low-pressure part 20c which drive the generator 22 through a common shaft 32.

A waste-gas line 34 is connected to an inlet 30a of the waste-heat steam generator 30 in order to supply working medium AM or flue gas expanded in the gas turbine 2 into the waste-heat steam generator 30. The expanded working medium AM from the gas turbine 2 leaves the waste-heat steam generator 30 through an outlet 30b thereof in the direction of a non-illustrated chimney.

The waste-heat steam generator 30 includes a condensate preheater 40 that has an inlet side for receiving condensate K from the condenser 26 through a condensate line 42, into which a condensate-pump unit 44 is connected. The condensate preheater 40 has an outlet side connected through a line 45 to a feedwater tank 46. Moreover, the condensate line 42 may be connected directly to the feedwater tank 46 through a non-illustrated bypass line, in order to bypass the condensate preheater 40, as required. The feedwater tank 46 is connected through a line 47 to a high-pressure feed pump 48 with medium-pressure extraction.

The high-pressure feed pump 48 brings feedwater S flowing out of the feedwater tank 46 to a pressure level suitable for a high-pressure stage 50 of the water/steam circuit 24. The high-pressure stage 50 is associated with the high-pressure part 20a of the steam turbine 20. The feedwater S, which is under high pressure, can be supplied to the high-pressure stage 50 through a first feedwater preheater 52. The first feedwater preheater 52 has an outlet side connected to a high-pressure drum 58 through a feedwater line 56 that is capable of being shut off through the use of a valve 54. The high-pressure drum 58 is connected, for the formation of a water/steam recirculation 62, to a high-pressure evaporator 60 disposed in the waste-heat steam generator 30. In order to discharge fresh steam F, the high-pressure drum 58 is connected to a high-pressure superheater 64 which is disposed in the waste-heat steam generator 30. The high-pressure superheater 64 has an outlet side connected to a steam inlet 66 of the high-pressure part 20a of the steam turbine 20.

A steam outlet 68 of the high-pressure part 20a of the steam turbine 20 is connected through an intermediate superheater 70 to a steam inlet 72 of the medium-pressure part 20b of the steam turbine 20. A steam outlet 74 of the medium-pressure part 20b is connected through an overflow line 76 to a steam inlet 78 of the low-pressure part 20c of the steam turbine 20. A steam outlet 80 of the low-pressure part 20c of the steam turbine 20 is connected through a steam line 82 to the condenser 26, so that the closed water/steam circuit 24 is obtained.

Moreover, a branch line 84 branches off from the high-pressure feed pump 48 at an extraction point at which the condensate K has reached a medium pressure. This branch line is connected through a second feedwater preheater 86 or medium-pressure economizer to a medium-pressure stage 90 of the water/steam circuit 24. The medium-pressure stage 90 is associated with the medium-pressure part 20b of the steam turbine 20. For this purpose, the second feedwater preheater 86 has an outlet side connected to a medium-pressure drum 96 of the medium-pressure stage 90 through a feedwater line 94 that is capable of being shut off through the use of a valve 92.

The medium-pressure drum 96 is connected to a heating surface 98 disposed in the waste-heat steam generator 30 and constructed as a medium-pressure evaporator, to form a water/steam recirculation 100. In order to discharge medium-pressure fresh steam F', the medium-pressure drum 96 is connected through a steam line 102 to the intermediate superheater 70 and therefore to the steam inlet 72 of the medium-pressure part 20b of the steam turbine 20.

A further line 110, which is provided with a low-pressure feed pump 107 and is capable of being shut off through the use of a valve 108, branches off from the line 47 and is connected to a low-pressure stage 120 of the water/steam circuit 24 at a connection VI. The low-pressure stage 120 is associated with the low-pressure part 20c of the steam turbine 20. The low-pressure stage 120 includes a low-pressure drum 122 which is connected to a heating surface 124 disposed in the waste-heat steam generator 30 and constructed as a low-pressure evaporator, to form a water/steam recirculation 126. In order to discharge low-pressure fresh steam F", the low-pressure drum 122 is connected to the overflow line 76 through a steam line 128, into which a low-pressure superheater 129 is connected. The water/steam circuit 24 of the gas and steam turbine plant 1 thus includes three pressure stages 50, 90, 120 in the exemplary embodiment. Alternatively, however, fewer pressure stages, in particular two, may also be provided.

The gas turbine plant 1a is constructed to operate with a gasified synthesis gas SG which is generated by gasification of a fossil fuel B. Gasified oil is provided as the synthesis gas in the exemplary embodiment. For this purpose, an inlet side of the combustion chamber 6 of the gas turbine 2 is connected through a fuel line 130 to a gasification device 132. Oil which is used as the fossil fuel B can be supplied to the gasification device 132 through a charging system 134.

In order to provide oxygen $O_2$ required for gasifying the fossil fuel B, an air separation plant 138 is located upstream of the gasification device 132 through an oxygen line 136. The air separation plant 138 has an inlet side which is capable of being loaded with a partial stream T of the air compressed in the air compressor 4. For this purpose, the air separation plant 138 is connected on the inlet side to an extraction air line 140 which branches off from the compressed-air line 8 at a branch point 142. Moreover, a further air line 143, into which an additional air compressor 144 is connected, opens into the extraction air line 140. Therefore, in the exemplary embodiment, a total air stream L flowing into the air separation plant 138 is composed of the partial stream T branched off from the compressed-air line 8 and the air stream conveyed by the additional air compressor 144. A set-up concept of this type is also referred to as a partly integrated plant concept. In an alternative embodiment, a so-called fully integrated plant concept, the further air line 143, together with the additional air compressor 144, may also be dispensed with. In that case, the air separation plant 138 is fed air completely through the partial stream T extracted from the compressed-air line 8.

Nitrogen $N_2$, which is obtained in the air separation plant 138 during the separation of the air stream L, in addition to the oxygen $O_2$, is supplied to a mixing apparatus 146, through a nitrogen line 145 connected to the air separation plant 138. There, the nitrogen is admixed with the synthesis gas SG. In this case, the mixing apparatus 146 is constructed for particularly uniform strand-free mixing of the nitrogen $N_2$ with the synthesis gas SG.

The synthesis gas SG flowing off from the gasification device 132 first passes through the fuel line 130 into a crude-gas waste-heat steam generator 147, in which cooling of the synthesis gas SG takes place by heat exchange with a flow medium. High-pressure steam generated during this heat exchange is supplied to the high-pressure stage 50 of the water/steam circuit 24 in a non-illustrated manner.

A soot-washing apparatus 148 for the synthesis gas SG and a desulfuration plant 149 are connected into the fuel line 130 downstream of the crude-gas waste-heat steam generator 147 and upstream of the mixing apparatus 146, as seen in the direction of flow of the synthesis gas SG.

A heat exchanger 150 has a primary side connected into the fuel line 130 between the soot-washing apparatus 148 and the desulfuration plant 149 and therefore upstream of the mixing apparatus 146, as seen in the direction of flow of the gasified fuel B. The heat exchanger 150 has a secondary side constructed as an evaporator for water W acting as a flow medium. A connection V connects the heat exchanger 150 to the feedwater line 94. At the same time, the heat exchanger 150 is constructed as a medium-pressure evaporator for the water W and therefore for generating steam at a pressure of about 5 to 7 bar. In other words, the pressure is still sufficient for admixing the steam to the synthesis gas SG upstream of the combustion chamber 6.

The heat exchanger 150 has a steam side which is connected through a steam line 152, having a valve 158, to a further mixing apparatus 154 which is itself connected into the fuel line 130 downstream of the mixing apparatus 146, as seen in the direction of flow of the synthesis gas SG. The heat exchanger 150 is thus connected on the steam side to the combustion chamber 6 of the gas turbine 2 through the steam line 152 and through the further mixing apparatus 154. The medium-pressure steam generated in the heat exchanger 150 can therefore be supplied to the synthesis gas SG flowing into the combustion chamber 6, in which case the synthesis gas SG is laden with steam. This ensures a particularly low pollutant emission during the combustion of the synthesis gas SG. At the same time, a heat exchanger 155 is connected into the fuel line 130 between the mixing apparatus 146 and the further mixing apparatus 154. Another line with a valve 157 is connected through a connection VII to the steam line 102.

Moreover, the heat exchanger 150 is connected on the steam side to the low-pressure stage 120 of the water/steam circuit 24 through a branch line 156 which branches off from the steam line 152 and through a connection I. At the same time, a regulating valve 165 is connected into the branch line 156 in order to ensure a pressure level suitable for the low-pressure stage 120 in an outflow-side part of the branch line 156.

In order to provide for the further cooling of the crude gas, a second heat exchanger 159 has a primary side connected into the fuel line 130 downstream of the heat exchanger 150, in the direction of flow of the synthesis gas SG. The heat exchanger 159 has a secondary side constructed as an evaporator for water W acting as the flow medium. In this case, the heat exchanger 159 is constructed as a low-pressure evaporator for the water W and therefore for generating steam at about 6–7 bar. The heat exchanger 159 has a steam side connected to the branch line 156.

In order to provide for effective separation of sulfur compounds from the synthesis gas SG, a COS hydrolysis device 160 is connected into the fuel line 130 between the heat exchanger 159 and the desulfuration plant 149. A further heat exchanger 161 for further crude-gas cooling has a primary side located upstream of the COS hydrolysis device 160 in order to establish a particularly favorable temperature for COS hydrolysis. This heat exchanger 161 has a secondary side loaded with medium-pressure feedwater from the water/steam circuit 24, as is illustrated by an arrow P.

A further heat exchanger 151 is located downstream of the COS hydrolysis device 160 in order to cool the crude gas. The heat exchanger 151 has a secondary side loaded with medium-pressure feedwater from the water/steam circuit 24, as is illustrated by an arrow P. In order to provide for the further cooling of the crude gas, two further heat exchangers 153 and 167 are connected into the fuel line 130 upstream of the desulfuration plant 149, as is seen in the direction of flow of the crude gas. In the heat exchanger 153, the crude gas is cooled on the primary side and the desulfurated crude gas is heated again on the secondary side. The crude gas is cooled in the heat exchanger 167 to a temperature at which desulfuration of the crude gas can take place in a particularly advantageous way. At the same time, the heat exchanger 167 is loaded on the secondary side with cold condensate or cooling water in a non-illustrated manner.

In order to provide for particularly low pollutant emissions during the combustion of the gasified fuel in the combustion chamber 6, there may be provision for loading the gasified fuel with steam prior to entry into the combustion chamber 6. This may take place in a saturator system in a particularly thermally advantageous way. For this purpose, a saturator may be connected into the fuel line 130 between the mixing apparatus 146 and the heat exchanger 155. The gasified fuel would be carried in the saturator in countercurrent to a heated water stream that is also referred to as saturator water. In this case, the saturator water or the water stream circulates in a saturator circuit which is connected to the saturator and into which a circulating pump is normally connected. At the same time, a feedline is connected to the saturator circuit in order to compensate for the losses of saturator water which occur during the saturation of the gasified fuel.

In order to cool the partial stream T of compressed air to be supplied to the air separation plant 138, which is also referred to as extraction air, a heat exchanger 162 has a primary side connected into the extraction air line 140 and a secondary side constructed as a medium-pressure evaporator for a flow medium S'. In order to form an evaporator recirculation 163, the heat exchanger 162 is connected to a water/steam drum 164 constructed as a medium-pressure drum. The water/steam drum 164 is connected through lines 166, 168 at connections III, IV to the medium-pressure drum 96 associated with to the water/steam recirculation 100. Alternatively, however, the heat exchanger 162 may also be directly connected on the secondary side to the medium-pressure drum 96. Therefore, in the exemplary embodiment, the water/steam drum 164 is connected indirectly to the heating surface 98 which is constructed as a medium-pressure evaporator. Moreover, a feedwater line 170 is connected to the water/steam drum 164 for a make-up feed of evaporated flow medium S'.

A further heat exchanger 172, which has a secondary side constructed as a low-pressure evaporator for a flow medium S", is connected into the extraction air line 140 downstream of the heat exchanger 162, as seen in the direction of flow of the partial stream T of compressed air. In this case, in order to form an evaporator recirculation 174, the heat exchanger 172 is connected to a water/steam drum 176 that is constructed as a low-pressure drum. In the exemplary embodiment, the water/steam drum 176 is connected through lines 178, 180 at connections I, II to the low-pressure drum 122 associated with the water/steam recirculation 126 and is thus connected indirectly to the heating surface 124 which is constructed as a low-pressure evaporator. Alternatively, however, the water/steam drum 176 may also be connected in another suitable way, in which the steam extracted from the water/steam drum 176 is capable of being supplied as process steam and/or as heating steam to a secondary consumer. In a further alternative embodiment, the heat exchanger 172 may also be connected directly on the secondary side to the low-pressure drum 122. Moreover, the water/steam drum 176 is connected to a feedwater line 182.

The evaporator recirculations 163, 174 may each be constructed as a forced recirculation, in which the recirculation of the flow medium S' or S" is ensured by a circulating pump, and the flow medium S', S" evaporates at least partially in the heat exchanger 162 or 172 that is constructed as an evaporator. In the exemplary embodiment, however, both the evaporator recirculation 163 and the evaporator recirculation 174 are each constructed as a natural recirculation, in which the recirculation of the flow medium S' or S" is ensured by pressure differences established during the evaporation process and/or by a geodetic configuration of the respective heat exchanger 162 or 172 and of the respective water/steam drum 164 or 176. In this embodiment, only one comparatively small-dimensioned, non-illustrated circulating pump for starting up the system is connected into each of the evaporator recirculation 163 or the evaporator recirculation 174.

A cooling-air line 192 branches off from the extraction air line 140 downstream of the heat exchanger 172, as seen in the direction of flow of the partial stream T. A partial quantity T' of the cooled partial stream T is capable of being supplied to the gas turbine 2 through the cooling-air line as cooling air for blade cooling.

Even when oil is used as the fossil fuel B, the gas and steam turbine plant 1 has particularly high overall efficiency. Utilizing the heat which is carried in the crude gas and which may, in particular, take the form of latent heat at a comparatively low temperature level for evaporating the water W makes it possible to supply this heat into the plant process in a particularly effective and flexible way. In particular, supplying the steam which is thereby generated into the synthesis gas SG flowing out of the mixing apparatus 146 makes it possible for the mixed gas to be laden sufficiently with steam, even without the connection of a saturator which per se, together with the further components associated therewith, would entail a significant outlay in terms of manufacture and assembly. This ensures that even low limit values for pollutant emissions are adhered to at a particularly low outlay.

We claim:

1. A gas and steam turbine plant, comprising:
   a gas turbine having a flue-gas side;
   a combustion chamber connected to said gas turbine;
   a steam turbine having a water/steam circuit;
   a waste-heat steam generator disposed downstream of said gas turbine on said flue-gas side, said steam generator having heating surfaces connected into said water/steam circuit;
   a fuel line connected to said combustion chamber;
   a gasification device for producing gasified fuel, said gasification device connected into said fuel line, upstream of said combustion chamber;
   a mixing apparatus connected into said fuel line for admixing nitrogen to the gasified fuel; and
   a heat exchanger having a primary side connected into said fuel line, upstream of said mixing apparatus, as seen in a flow direction of the gasified fuel, said heat exchanger having a secondary side constructed as an evaporator for a flow medium, and said heat exchanger having a vapor side connected to said combustion chamber.

2. The gas and steam turbine plant according to claim 1, wherein said secondary side of said heat exchanger is constructed as a medium-pressure evaporator for water.

3. The gas and steam turbine plant according to claim 1, wherein said water/steam circuit has a low-pressure stage, a branch line is connected between said vapor side of said heat exchanger and said low-pressure stage, and a regulating valve is connected in said branch line.

4. The gas and steam turbine plant according to claim 1, including a crude-gas waste-heat steam generator connected into said fuel line upstream of said heat exchanger.

* * * * *